United States Patent

Tomesen et al.

Patent Number: 5,600,474
Date of Patent: Feb. 4, 1997

[54] TRANSMISSION SYSTEM WITH POLARIZATION CONTROL

[75] Inventors: Markus T. Tomesen, Venlo; Engelbertus C. M. Pennings; Dolf Schouten, both of Eindhoven, all of Netherlands

[73] Assignee: U.S. Philips Corporation, New York, N.Y.

[21] Appl. No.: 488,308

[22] Filed: Jun. 7, 1995

[30] Foreign Application Priority Data

Jun. 9, 1994 [EP] European Pat. Off. ............ 94201650

[51] Int. Cl.⁶ .......................... H04B 10/06; H04B 10/00
[52] U.S. Cl. .......................... 359/192; 359/110; 359/156
[58] Field of Search ........................... 359/192, 194, 359/110, 122, 156, 173

[56] References Cited

U.S. PATENT DOCUMENTS

| 4,979,235 | 12/1990 | Rumbaugh et al. | 359/192 |
| 4,989,200 | 1/1991 | Olshansky et al. | 359/192 |
| 5,295,013 | 3/1994 | Ouo | 359/192 |

FOREIGN PATENT DOCUMENTS

| 0142020 | 5/1985 | European Pat. Off. . |
| 8607513 | 12/1986 | WIPO . |

OTHER PUBLICATIONS

"Comparison of Polarization Handling Methods in Coherent Optical Systems", by R. Noe et al, Journal of Lightwave Technology, vol. 9, No. 10, Oct. 1991, pp. 1353–1366.

Primary Examiner—Wellington Chin
Assistant Examiner—Kinfe-Michael Negash
Attorney, Agent, or Firm—Leroy Eason

[57] ABSTRACT

A transmission system having a polarization-sensitive receiver which includes polarization adaptor for changing the state of polarization of a received signal until it corresponds to an optimum polarization. For determining the direction in which the polarization should be adjusted, local signal generators produce polarization variations which influence the output signal of the polarization adaptor and the change in the signal is detected. In order to prevent slow variations in the received signal from affecting the polarization detection, a band-pass filter is included to suppress such variations.

8 Claims, 5 Drawing Sheets

TRANSMISSION SYSTEM WITH POLARIZATION CONTROL

BACKGROUND OF THE INVENTION

1. Field of the Invention

The invention relates to a transmission system comprising a transmitter for convening an input signal into a transmit signal, and a channel for transporting the transmit signal to a receiver. The receiver comprises polarization adapting means for deriving from a received signal a further signal which has a state of polarization which is variable in response to a control signal, supplied to the polarization adapting means. The transmission system also comprises means for effecting polarization variations in the further signal produced by the polarization adapting means, and the receiver further comprises means for measuring an error signal corresponding to the difference between the actual state of polarization and the desired state of polarization of the further signal, and control means for deriving the control signal from the error signal.

The invention likewise relates to a receiver for such a transmission system.

2. Description of the Related Art

A transmission system as defined in the opening paragraph is known from the journal article "Comparison of Polarization Handling Methods in Coherent Optical Systems" by R. Noë et al. in IEEE Journal of Lightwave Technology, Vol. 9, No. 10, October 1991.

For transporting an input signal through a channel, the signal originating from a signal source is amplitude, frequency or phase modulated by the input signal in the transmitter. The transmit signal thus obtained is transported to the receiver by the optical channel. This transmission system may be an optical transmission system, but it may also be a radio transmission system. An optical channel may comprise, for example, a glass fibre, but the channel may also comprise a direct-sight link through free space. In radio systems the channel is formed by free space.

Various types of receivers are possible for receiving the signal transmitted by the transmitter. In a number of these receivers, the received signal, or an auxiliary signal necessary for the demodulation, has certain polarization properties. Examples of these receivers are receivers utilizing polarization-sensitive components such as, for example, aerials, optical amplifiers or optical filters. Other polarization-sensitive receivers are the coherent (optical) receivers such as heterodyne, homodyne and phase-diversity receivers.

Generally, the polarization properties, for example, the direction of polarization, of the received optical signal are indefinite and, furthermore, not constant with time. Without precautionary measures the amplitude of the demodulated signal may vary between a maximum value (when the actual state of polarization corresponds to the desired state of polarization) and a minimum value (when the actual state of polarization is orthogonal relative to the desired state of polarization).

An example of a polarization-sensitive component is a laser amplifier for amplifying the received signal. The gain factor of such a laser amplifier often depends on the state of polarization of the received optical signal. For achieving a maximum gain factor, the state of polarization of the received signal is changed by polarization adapting means, so that this state of polarization corresponds to the desired state of polarization. The further signal is then the received signal whose state of polarization has changed.

In a coherent optical receiver such as, for example, a heterodyne receiver, the optical signal having a very high frequency (for example, $10^{14}$ Hz) is converted into a signal having a much lower frequency (for example, $10^9$ Hz). For this purpose, an optical directional coupler and an optoelectric converter mix the received optical signal with an optical signal coming from a local laser. As a result, an intermediate frequency signal is obtained which has a frequency that is equal to the difference between the frequency of the received light signal and that of the optical signal coming from the local laser.

In order to let this mixing process be attended with the least possible signal loss, it is necessary that the state of polarization of the received optical signal and the state of polarization of the optical signal coming from the local laser be the same. This may be achieved in that the polarization adapting means adapt the state of polarization of the received optical signal or the state of polarization of the optical signal generated by the local laser. The further optical signal is in this case the intermediate frequency signal obtained from the combination of the received optical signal and the locally generated signal.

For detecting an error signal which is a measure of the difference between the actual state of polarization and the desired state of polarization, (minor) polarization variations are effected in the output signal of the polarization adapting means. If the output signal of the receiver becomes larger when polarization variations in a specific direction are made, this means that the state of polarization is to be adapted more in this direction. On the other hand, if the output signal of the receiver becomes smaller when these polarization variations are made, the state of polarization is to be adapted in another direction. If no change in the output signal of the receiver occurs, that shows there is a (substantially) optimum polarization of the further signal. Instead of effecting polarization variations in the receiver, it is likewise conceivable that they are already effected in the transmitter.

In a transmission system as defined in the opening paragraph it appears that the operation of the polarization adapting means may be disturbed by undesired variations in the receiver input signal, or (in the case of a coherent receiver) in the signal coming from the local laser. These undesired variations may be, for example, amplitude variations or polarization variations of the input signal.

SUMMARY OF THE INVENTION

It is an object of the invention to provide a transmission system as defined in the opening paragraph in which the detrimental effect of variations of the input signal on the operation of the polarization adapting means is reduced.

For this purpose, the invention is characterized in that the measuring means comprise filter means for obtaining an error signal in which frequency components below a certain limit frequency are suppressed, and in that a significant number of the frequency components of the polarization variations are situated above the limit frequency.

The invention is based on the recognition that the effect of undesired variations of the input signal arises from the measuring means not being capable of distinguishing between undesired variations of the received signal and the polarization variations that are effected for detecting polarization error in the optical signal. Since these undesired variations of the received signal are relatively low-frequency variations by nature, the insertion of the filter means considerably reduces the effect of these variations on the error signal. In that case, however, for determining the influence of the effected polarization variations on the output signal of the receiver, an adequate number of frequency components in the effected polarization variations must lie above the cut-off frequency.

An embodiment of the invention is characterized in that the receiver comprises amplitude control means which have a cut-off frequency lying below the limit frequency, which amplitude control means are inserted between the polarization adapting means and the measuring means.

The optical receiver may comprise amplitude control means which maintain the amplitude of an output signal or of an intermediate frequency signal in the receiver at a desired level. Such amplitude control means are capable of removing slow amplitude variations, but are no longer capable of effecting this if rapid amplitude variations occur which have a frequency higher than a certain cut-off frequency. This means that the amplitude variations having a frequency higher than this cut-off frequency will reach the output of the amplitude control means (substantially) unattenuated, whereas the slow amplitude variations will be (substantially) completely suppressed. If the cut-off frequency is selected to be lower than the limit frequency, the amplitude control means may also perform the function of filter means. In addition, the effect is then avoided that the amplitude variations caused by the effected polarization variations, which amplitude variations are to be measured by the measuring means, are removed by the amplitude control means.

BRIEF DESCRIPTION OF THE DRAWINGS

The invention will be further explained with reference to the drawing Figures in which like reference characters denote like elements, in which.

DESCRIPTION OF THE PREFERRED EMBODIMENTS

Figure 1:
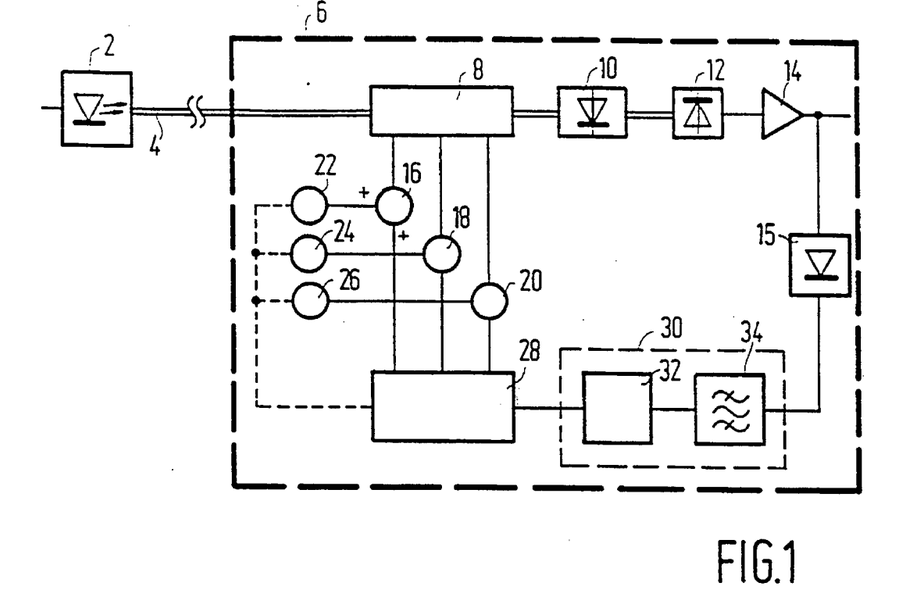
FIG. 1 shows a transmission system according to the invention.

In the transmission system shown in FIG. 1 an input signal is applied to a transmitter 2. An output of the transmitter 2, carrying the transmit signal, in this case an optical transmit signal, for its output signal, is connected to an input of a receiver 6 by a channel, in this case formed by a glass fibre 4. The input signal of the receiver 6 is applied to the polarization adapting means 8. The output of the polarization adapting means 8, carrying the further signal for its output signal, is connected to an input of a laser amplifier 10. The output of the laser amplifier 10 is connected to an input of a photodiode 12. The output of the photodiode 12 is connected to an input of an amplifier 14. The output of the amplifier 14 is connected to an input of an amplitude detector 15 and to the output of the receiver 6. The output of the amplitude detector 15 is connected to an input of the measuring means 30. The input signal of the measuring means 30 is applied to an input of the filter means, in this case formed by a band-pass filter 34. The output of the band-pass filter 34 is connected to an input of a detector 32.

The output of the measuring means 30 is connected to an input of the control means 28. A first output of the control means 28 is connected to a first input of an adder circuit 16. A second output of the control means 28 is connected to a first input of an adder circuit 18. A third output of the control means 28 is connected to a first input of an adder circuit 20.

A fourth output of the control means 28 is connected to a control input of means for effecting polarization variations, in this case formed by three signal generators 22, 24 and 26. An output of the signal generator 22 is connected to a second input of the adder circuit 16. An output of the signal generator 24 is connected to a second input of the adder circuit 18. An output of the signal generator 26 is connected to a second input of the adder circuit 20. The outputs of the adder circuits 16, 18 and 20 are connected to three corresponding control inputs of the polarization adapting means 8.

The transmitter 2 generates an optical signal that is modulated in dependence on the input signal. In this context it is then conceivable that amplitude modulation, frequency modulation or phase modulation is applied. The optical signal thus obtained is transported through the glass fibre 4 to the receiver 6. This transport may considerably affect the state of polarization of the optical signal. Generally, the state of polarization of the received optical signal will be linear, circular or elliptical. As the laser amplifier 10 has a maximum gain factor for linearly polarized light that has a certain direction of polarization, the polarization adapting means 8 are to be capable of deriving an optical signal that is linearly polarized in a certain direction from an optical signal that has an arbitrary state of polarization.

It has appeared that this is always possible with polarization adapting means comprising two or more, for example three, autonomously controllable sections. The manner of control of these three sections will be discussed in the following. The output signal of the polarization adapting means 8 is amplified by the laser amplifier 10 and converted into an electric signal by the photodiode 12. This electric signal is amplified to a desired output level by an amplifier 14. The measuring means 30 measure the power of the part of the output signal of the amplifier 14 which signal has a passband lying above the limit frequency. For this purpose, the output signal of the amplifier 14 is filtered by the band-pass filter 34 and the amplitude of the output signal of this band-pass filter 34 is detected by the detector 32. The control means 28 determine the control signals for the three sections of the polarization adapting means 8 in response to the output signal of the measuring means 30.

The control means 28 sequentially activate the signal generators 22, 24 and 26. The signal generators may be arranged for generating a periodic signal but, alternatively, it is possible for the signal generators to generate a step-like signal. If the active signal generator generates a periodic signal, the polarization of the optical output signal of the polarization adapting means will change periodically, which leads to a periodic change of the output signal of the amplifier 14. This periodic change is converted by the amplitude detector 15 into a periodic signal whose amplitude is measured by the measuring means 30 via the bandpass filter 34 and the detector 32. If the control means output signal belonging to the active signal generator is such that there is an optimum attendant state of polarization, the effect the generated polarization variations have on the amplitude of the output signal of amplifier 14 will be small, because this optimum is relatively flat. As a result, the output signal of the measuring means will be small. If, however, there is no difference between the actual state of polarization and the optimum state of polarization, the effect of the generated polarization variations is larger and so is the output signal of the measuring means. By setting this particular control signal by the control means, so that the measuring means have a minimum output signal, an optimum state of polarization of the output signal of the polarization adapting means is obtained.

To optimize the setting of all the sections of the polarization adapting means 8, the signal generators are sequentially activated and the appropriate control signal is optimized by the control means.

If step-like polarization variations are made, there may be determined via the measuring means whether the amplitude of the output signal of the amplifier 14 increases or decreases. If this amplitude increases, the step-like polarization variation has been made in the right direction, and the output signal of the control means is adapted further in that direction until this amplitude starts decreasing again. The optimum has then just been exceeded. If this amplitude decreases, the step-like polarization variation has been made in the wrong direction and the output signal of the control means is adapted in the opposite direction until the optimum is reached.

Here too, the signal generators are activated cyclically and the appropriate control signal is set to a value at which the state of polarization of the further optical signal is optimized.

Figure 2:
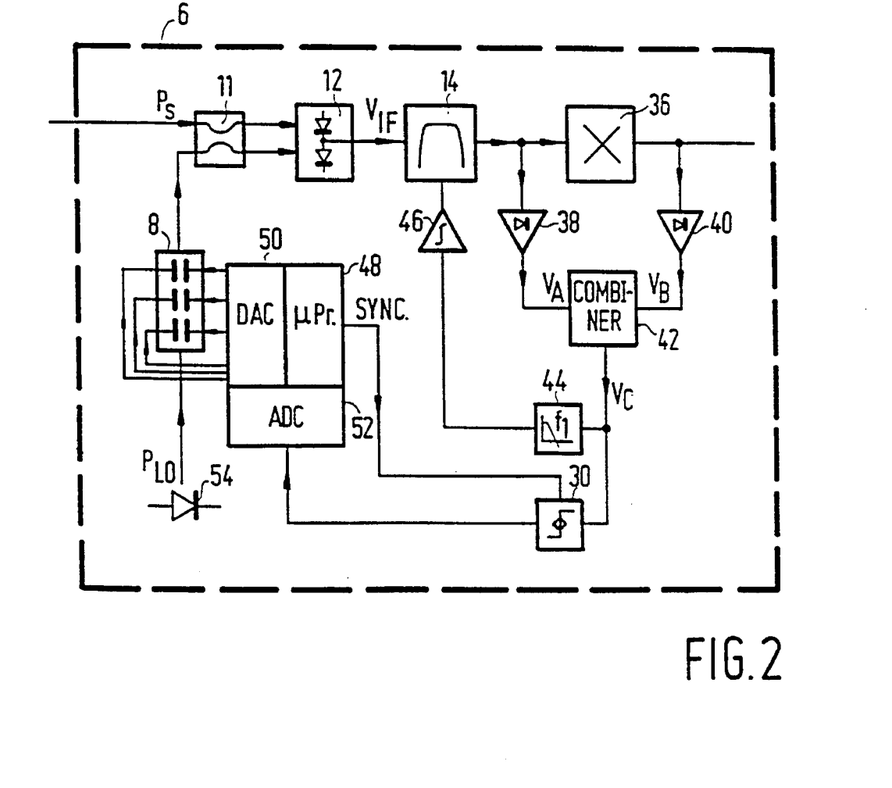
FIG. 2 shows a coherent receiver to be used in a transmission system according to the invention.

In the receiver shown in FIG. 2 the input signal is applied to a first input of a coupling element 11. An optical signal generated by a local laser 54 is applied to a second input of the coupling element 11 via the polarization adapting means 8. Two outputs of the coupling element 11 are connected to two inputs of an optoelectrical converter which comprises two photodiodes.

The output signal of the optoelectrical converter 12 is connected to an input of the amplitude control means, in this case formed by a controllable amplifier 14. The output of the controllable amplifier 14 is connected to an input of a demodulator 36 and to an input of an amplitude detector 38. The output of the demodulator 36 is connected to the output of the receiver 6 and to an input of an amplitude detector 40. The output of the amplitude detector 38 is connected to a first input of combiner means 42, while the output of the amplitude detector 40 is connected to a second input of the combiner means 42.

The output of the combiner means 42 is connected to an input of a low-pass filter 44 and to an input of measuring means 30. The output of the low-pass filter 44 is connected to an input of an integrator 46. The output of the integrator is connected to a control input of the controllable amplifier 14.

The output of the measuring means 30 is connected to an input of an analog-to-digital converter 52. The output of the analog-to-digital converter 52 is connected to a microprocessor 48. The microprocessor 48 is further coupled to digital-to-analog converters 50 whose outputs are connected to the polarization adapting means 8. A further output of the microprocessor 48 is connected to a synchronization input of the measuring means 30.

For the explanation of the operation of receiver 6, the received signal is assumed to be an FSK modulated optical signal. In the coupling unit 11 this received signal is combined with the signal coming from the local laser. As explained hereinbefore, the state of polarization of the received signal and that of the signal coming from the local laser is desirably the same. Since the signal coming from laser 54 is generally linearly polarized, and the state of polarization of the received signal is indefinite, the polarization adapting means are to be capable of converting the polarized light of the laser 54 into light having any conceivable state of polarization. As explained before, polarization adapting means 8 comprising three sections are used for this purpose.

The two output signals of the coupling element 11 are converted into one electric signal by the optoelectrical converter. This electric signal is amplified by the controllable amplifier 14 and then demodulated by the FSK demodulator.

A signal that is a measure for the amplitude of the receiver output signal is obtained by means of the combiner means 42 and the amplitude detectors 38 and 40. Thus, both the amplitude of the intermediate frequency signal and the amplitude of the demodulated intermediate frequency signal are used for determining the measure for the amplitude of the output signal. The use of the demodulated baseband signal leads to a better signal-to-noise ratio during the amplitude detection, because the signal-to-noise ratio after FM demodulation exceeds the signal-to-noise ratio of the intermediate frequency signal. Simultaneous use of the intermediate frequency signal during amplitude detection avoids excessive control of the variable amplifier in the event of a demodulated signal absent due to incorrect receiver tuning or reception of an unmodulated signal. The output signal of the combiner means is applied to the control input of the controllable amplifier 14 via the low-pass filter 44 and the integrator 46. The control loop formed by the controllable amplifier 14, the amplitude detectors 38 and 40, the low-pass filter 44 and the integrator 46, maintains the output signal of the receiver at a desired value. The low-pass filter 44 and the integrator 46 contribute to determining the cut-off frequency of the amplitude control means. The measuring means 30 determine the influence of the effected polarization variations on the output signal of the combiner means 42. The (analog) output signal of the measuring means 30 is converted into a digital error signal by the analog-to-digital converter 52. This digital error signal is processed by the microprocessor 48. In response to the output signal the microprocessor 48 determines the value of the control signals in a manner that will be explained below. In addition, the microprocessor 48 applies synchronization pulses to the measuring means 30 to trigger the measuring cycles.

Figure 3:
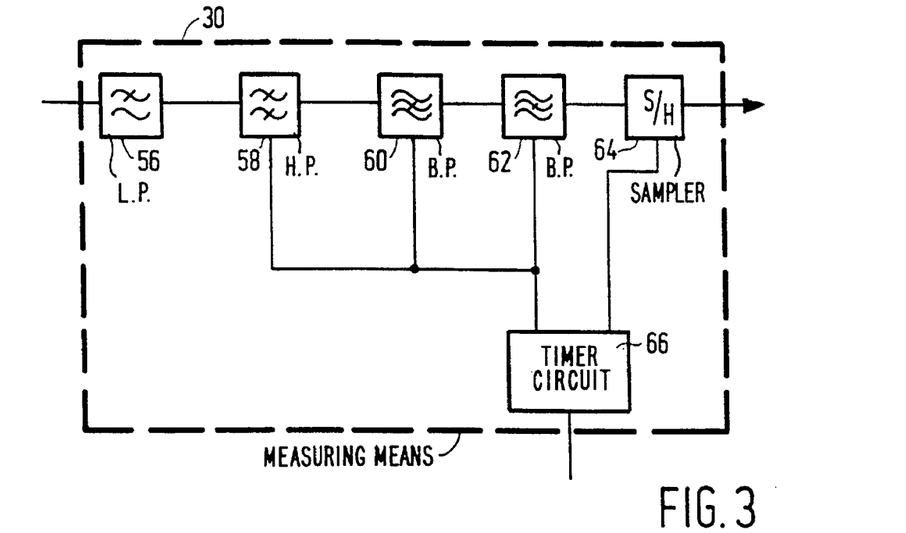
FIG. 3 shows an embodiment for the measuring means 30 to be used in a receiver as shown in FIG. 1 or 2.

In the measuring means 30 shown in FIG. 3 the input signal is applied to a first-order low-pass filter 56 which has a cut-off frequency of 60 kHz. The output of the low-pass filter 56 is connected to an input of a high-pass filter 58 which has a cut-off frequency of 15 kHz. The high-pass filter 58 is followed by a cascade combination of two band-rejection filters 60 and 62 which have a notch frequency of 1.5 kHz. The output of the band-rejection filter 62 is connected to an input of a sampling circuit 64. The output of the sampling circuit 64 forms the output of the measuring means.

A synchronization input of the measuring means 30 is connected to a timer circuit 66. A first output of the timer circuit 66 is connected to reset inputs of the filters 58, 60 and 62. A second output of the timer circuit 66 is connected to a control input of the sampling circuit 64.

The measuring means 30 shown in FIG. 3 are arranged for measuring the influence of step-like polarization variations that have been effected. In the period of time prior to the introduction of the variation of the polarization, the timer circuit applies a reset signal to the filters 58, 60 and 62, so that all the capacitors in the filters 58, 60 and 62 are short-circuited, and no energy is stored in these filters any longer. Effecting a polarization variation is attended with applying a synchronization pulse to the timer circuit 66. As a result, the reset signal is removed for a certain period of time. This makes it possible that the response of the cascade combination of filters 56, 58, 60 and 62 is available on the input of the sampling circuit 64. As a result of the band-pass nature of the cascade combination, this response will initially be equal to zero, increase afterwards, and reach a certain maximum value after a certain period of time and then fall back to zero again. The timer means 66 apply a sampling pulse to the sampling circuit 64 the moment when the input signal of this sampling circuit assumes a maximum value. This value is transferred to the output of the measuring means 30. Upon detection of this maximum value, the reset signal becomes active again, so that the filters 58, 60 and 62 again adopt their initial positions and are ready for a next measuring cycle. The advantage of short-circuiting the capacitors in the filters by the reset signal is that the filters 58, 60 and 62 reach their initial positions much more rapidly and, thus, a great many more measurements per time unit can be made.

Figure 4:
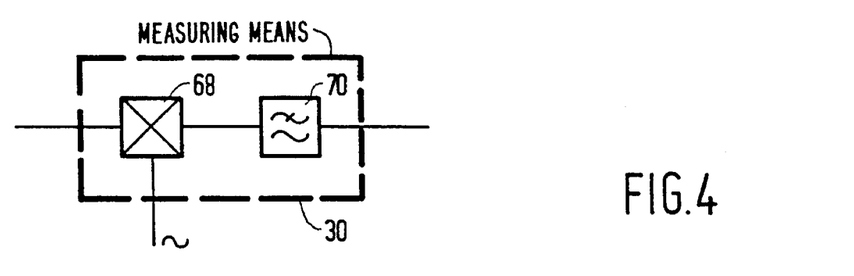
FIG. 4 shows an alternative embodiment for the measuring means 30 to be used in a receiver shown in FIG. 1 or FIG. 2.

In the measuring means 30 shown in FIG. 4 the input signal is applied to a first input of a multiplier circuit 68. A second input of the multiplier 68 is supplied with an auxiliary signal. The output of the multiplier circuit 68 is connected to the output of the measuring means 30 via a low-pass filter 70.

The measuring means shown in FIG. 4 are arranged for measuring sequentially effected variations of polarization in the receiver output signal. The auxiliary signal is a signal corresponding to that used for effecting the variations of polarization. The output signal of the low-pass filter is equal to the mean value of the product of the two input signals of the multiplier circuit 68. In the case of an optimum setting of the polarization adapting means 8, the influence of the polarization variations on the receiver output signal will be small, so that the output signal of the measuring means will be substantially zero.

Figure 5:
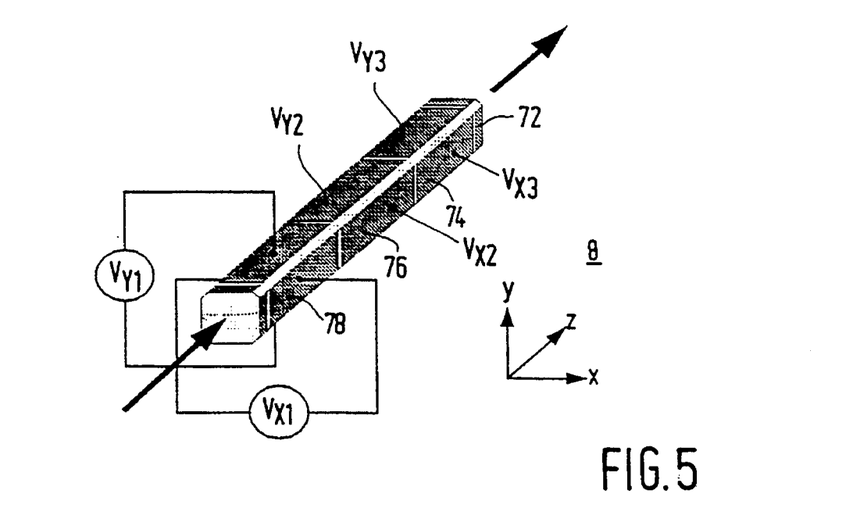
FIG. 5 shows an embodiment for the polarization adapting means 8 to be used in a receiver shown in FIG. 1 or FIG. 2.

The polarization adapting means 8 shown in FIG. 5 comprise a LiNbO$_3$ crystal having dimensions 1×1×65 mm. The electrodes are formed by first sputtering a chromium layer of 200 Å and then a gold layer of 1000 Å. The electrodes are isolated by removing the four corners. The three sections are obtained by interrupting the metal layers on the sides at two locations.

The LiNbO$_3$ crystal is a so-called birefringent medium whose refractive indices $n_o$ for electric fields in the x and y directions (see FIG. 5) are the same, but whose refractive index differs from the refractive index $n_e$ for fields in the z direction. By providing an electric field in a direction perpendicular to the z axis, the refractive indices in the x and y directions also become different. In the case of a suitable dimensioning, this leads to a fictitious optical wavelength difference $\lambda/k$. Customary values for k are 2, 3 or 4. The direction of the electric field is determined by the ratio of voltage $V_{x,i}$ to $V_{y,i}$.

For the relation between the voltages $V_{x,i}$ and $V_{y,i}$, and the angle between the electric field in the LiNbO$_3$ crystal and the x axis, the following then holds:

$$V_{x,i}(\alpha_i) = V_x^0 + V_x^{2\pi/k} \cos(\alpha_i) \quad (1)$$

$$V_{y,i}(\alpha_i) = V_y^0 + V_y^{2\pi/k} \sin(\alpha_i) \quad (2)$$

In (1) and (2) $V_x^0$ and $V_y^0$ are constants featuring the birefringence in the absence of the voltages $V_x$ and $V_y$, while $V_x^{2\pi/k}$ and $V_y^{2\pi/k}$ are constants representative of the voltages necessary for causing a phase difference of $2\pi/k$ to occur between the direction parallel with the electric field and the direction perpendicular to the electric field. If the voltages $V_x$ and $V_y$ change in quadrature, this means that if it were a rotating $\lambda/k$ image is obtained, whose angle of rotation can be set to any desired value.

If the transmission system is a microwave communication system, the polarization adapting means may be formed, for example, by a Faraday rotator included in a round waveguide. Such elements are of common knowledge in microwave technique.

Figure 6A:
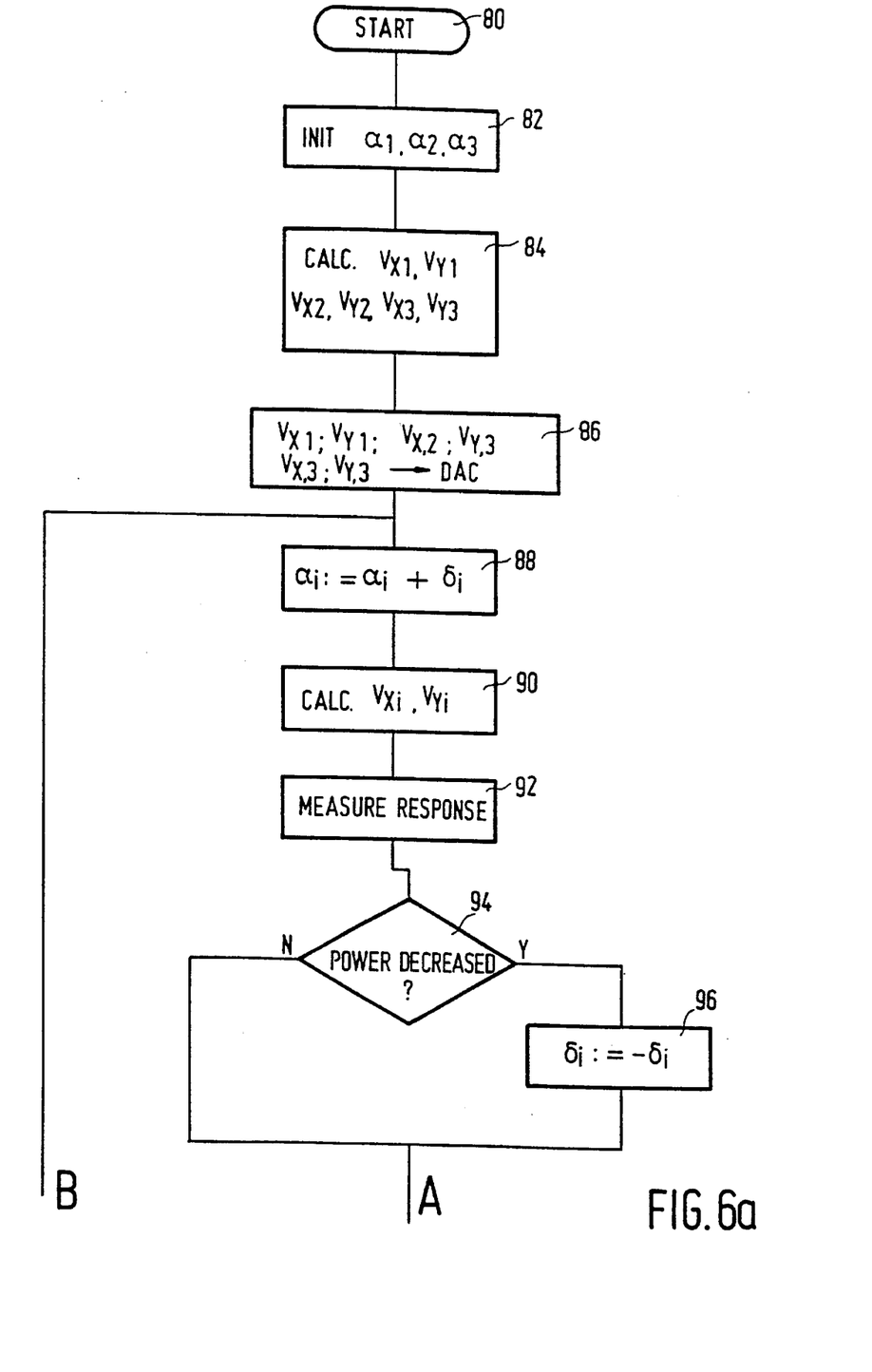
FIGS. 6a, 6b show flow charts of a program to be executed by the microprocessor 48 for controlling the polarization adapting means.
Figure 6B:
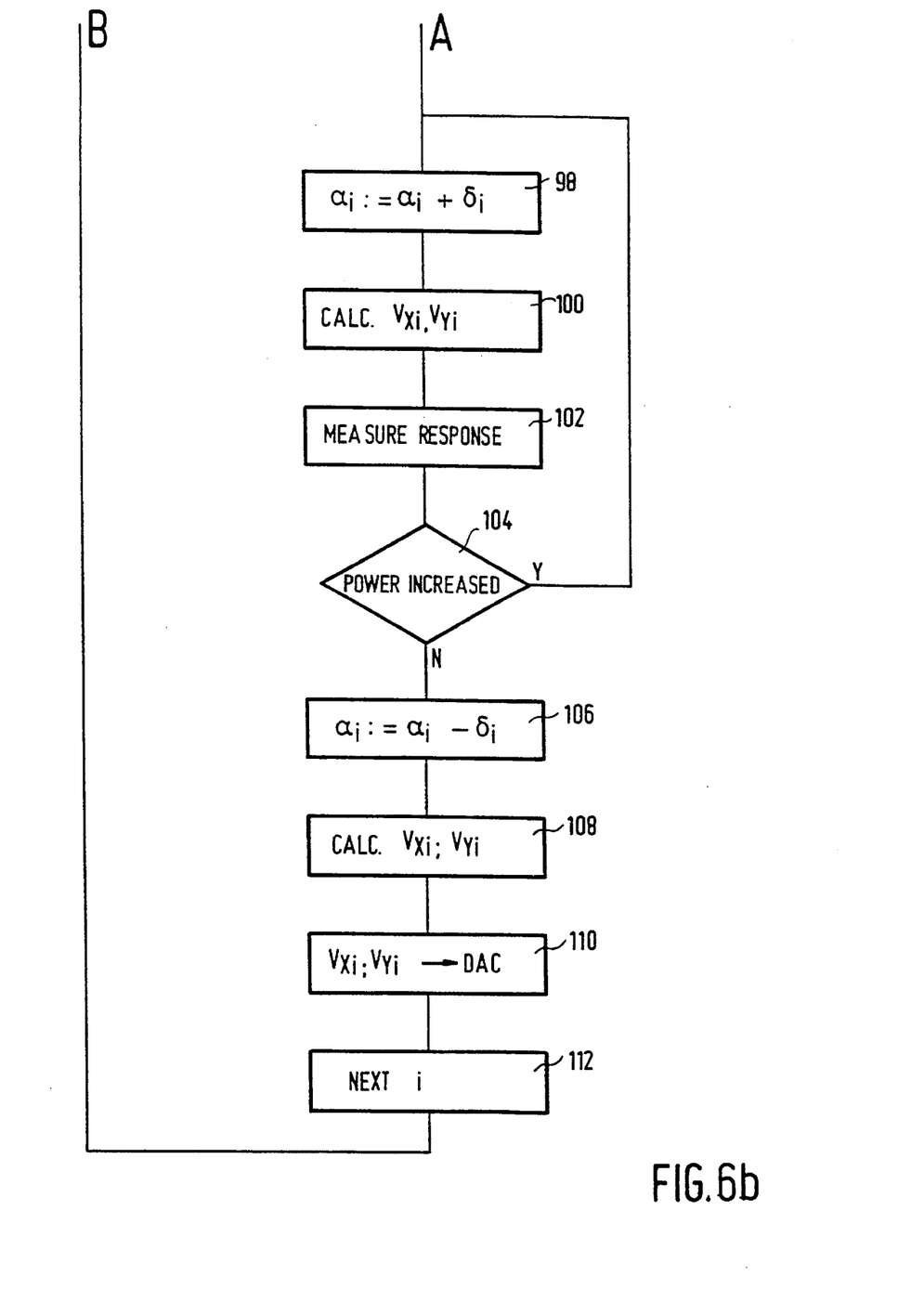

In the flow chart shown in FIG. 6a and FIG. 6b, the instructions have the connotations as stated in the Table below.

| No. | INSCRIPTION | CONNOTATION |
|---|---|---|
| 80 | START | Control is started. |
| 82 | INIT $\alpha_1,\alpha_2,\alpha_3,i$ | The values of $\alpha_1,\alpha_2,\alpha_3$, and i are initialized. |
| 84 | CALC $V_{x,1};V_{y,1};V_{x,2};$ $V_{y,2};V_{x,3};V_{y,3}$ | The values of $V_{x,1};V_{y,1};V_{x,2};$ $V_{y,2};V_{x,3};V_{y,3}$ are calculated. |
| 86 | $V_{x,1};V_{y,1};V_{x,2};$ $V_{y,2};V_{x,3};V_{y,3} \to$ DAC | The calculated values are applied to the digital-to-analog converters. |
| 88 | $\alpha_i := \alpha_i + \delta_i$ | The value of $\alpha_i$ is changed by a step $\delta_i$. |
| 90 | CALC $V_{x,i};V_{y,i}$ | The values of $V_{x,i}$ and $V_{y,i}$ belonging to the value of $\alpha_i$ are calculated. |
| 92 | MEASURE RESPONSE | The response of the receiver output signal to the polarization variation is calculated. |
| 94 | PWR DECREASED? | There is checked whether the output signal of the receiver has decreased as a result of the polarization variation. |
| 96 | $\delta_i := -\delta_i$ | The sign of the step $\delta_i$ is inverted. |
| 98 | $\alpha_i := \alpha_i + \delta_i$ | The value of $\alpha_i$ is changed by a step $\delta_i$. |
| 100 | CALC $V_{x,i}; V_{y,i}$ | The values of $V_{x,i}$ and $V_{y,i}$ belonging to the value of $\alpha_i$ are calculated. |
| 102 | MEASURE RESPONSE | The response of the receiver output signal to the polarization variation is measured. |
| 104 | POWER INCREASED? | There is checked whether the receiver output signal has increased. |
| 106 | $\alpha_i := \alpha_i - \delta_i$ | The value of $\alpha_i$ is changed by a step $\delta_i$. |
| 108 | CALC $V_{x,i};V_{y,i}$ | The values of $V_{x,i};V_{y,i}$ are calculated. |
| 110 | $V_{x,i};V_{y,i} \to$ DAC | The values of $V_{x,i}$ and $V_{y,i}$ are applied to the digital-to-analog converters 50. |
| 112 | NEXT i | The next section of the polarization adapting means is proceeded to. |

In instruction 80 the values of $\alpha_i$ for the three sections of the polarization adapting means 8 are set to initial values that have proved to be suitable. In instruction 82 the values of the voltages $V_{x,1};V_{y,1};V_{x,2};V_{x,3};V_{y,3}$ belonging to the values $\alpha_1$, $\alpha_2$ and $\alpha_3$ are calculated via the formulae (1) and (2). Then, in instruction 86, the calculated values are applied to the digital-to-analog converters 50 and converted into a control signal for the polarization adapting means 8.

In instruction 88 the value of $\alpha_i$ is increased by a value $\delta_1$. Thereafter, in instruction 90, the corresponding values of $V_{x,i}$ and $V_{y,i}$ are calculated. In instruction 92 is measured the response of the receiver output signal to the variation of $\alpha_i$. In instruction 94 there is checked whether the power of the receiver output signal has diminished. If the power of the receiver output signal has diminished indeed, the step $\delta_i$ was apparently made in the wrong direction and the sign of $\delta_i$ is changed. If the power has not diminished, the value of $\delta_i$ remains unchanged. It is noted that the measuring means 30 shown in FIG. 3 indicate an increase or decrease of the output signal of the receiver by the sign of the output signal of the measuring means 30.

In instructions 98, 100, 102 and 104, the value of $\alpha_i$ is increased by a value $\delta_i$ until the power of the receiver output signal starts to diminish. At that moment the optimum to be reached has already passed and, in instruction 106, $\alpha_i$ is reduced by a value $\delta_i$ and, in instructions 108 and 110, the corresponding values of the voltages $V_{x,i}$ and $V_{y,i}$ are calculated and applied to the digital-to-analog converters 50. Then, the value of i is changed and an optimization of the setting of the next section of the polarization adapting means 8 is commenced.

In this manner the control signals are optimized for each of the sections of the polarization adapting means. It is conceivable that, for avoiding convergence to a local optimum, the order of optimization is not always the same. It is likewise conceivable that optimization is effected from various starting points to provide more certainty that the global optimum is actually found. On top of this, it is conceivable that the various sections of the polarization adapting means are driven simultaneously, so that a global optimum is actually found.

Figure 7:
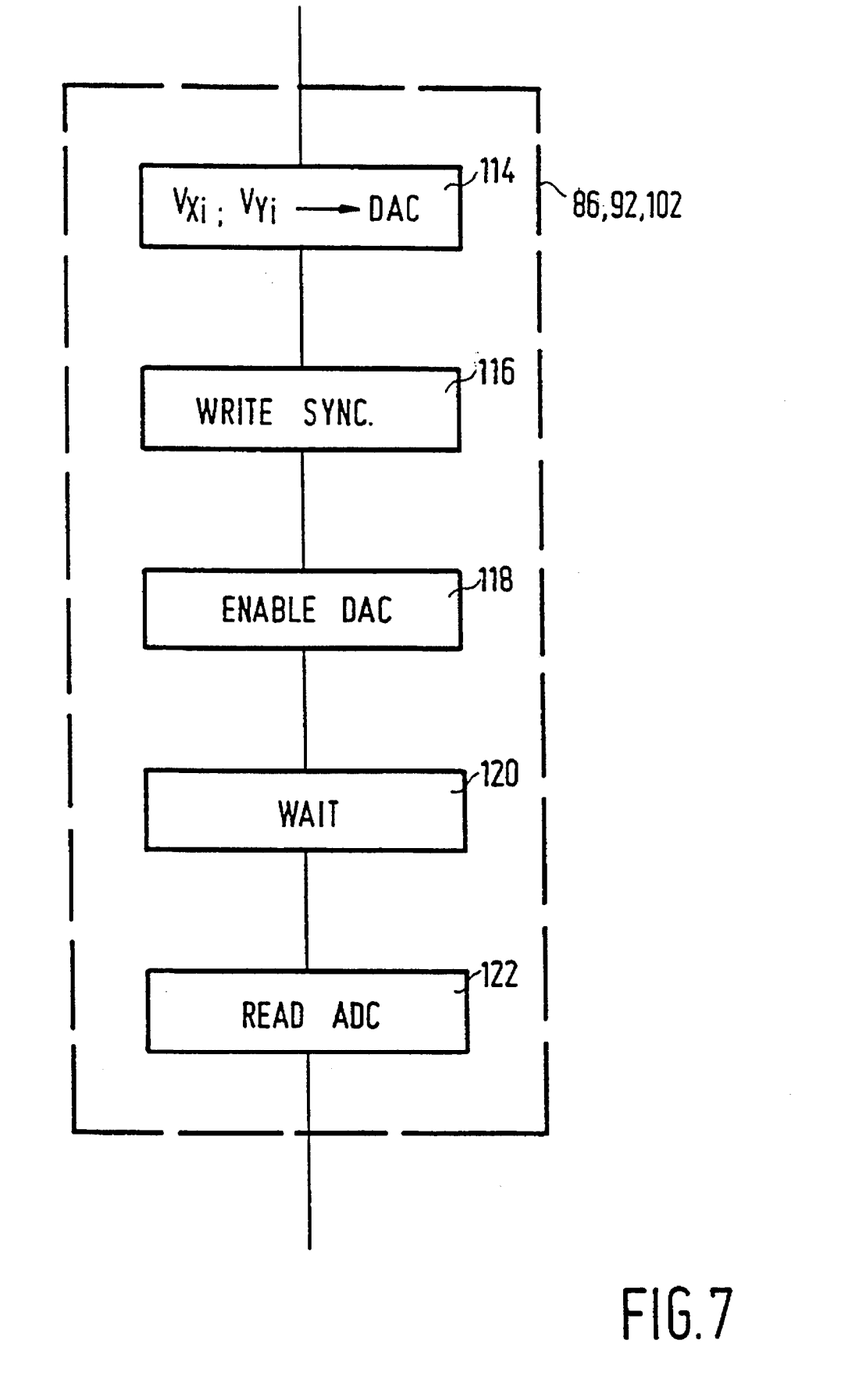
FIG. 7 shows a more detailed flow chart of the block 86 shown in FIGS. 6a, 6b.

In the flow chart shown in FIG. 7 the instructions have the connotations as shown in the Table below.

| No. | INSCRIPTION | CONNOTATION |
|---|---|---|
| 114 | $V_{x,i};V_{y,i} \rightarrow$ DAC | The values of $V_{x,i}$ and $V_{y,i}$ are fed to the digital-to-analog converters 50. |
| 116 | WRITE SYNC | A synchronization pulse is produced by the microprocessor. |
| 118 | ENABLE DAC | The converted values become available on the outputs of the digital-to-analog converters. |
| 120 | WAIT | There is waited for a certain period of time. |
| 122 | READ ADC | The output signal of the analog-to-digital converter 52 is read. |

In instruction 114, the particular values $V_{x,i}$ and $V_{y,i}$ are fed to the digital-to-analog converters 50. Thereafter, a synchronization pulse is fed to the measuring means 30 to trigger a measuring cycle (already described before). Then, in instruction 118, the output signals of the digital-to-analog converters 50 are actually fed to the polarization adapting means. Thereafter, the completion of the measuring cycle is waited for for a certain period of time. In instruction 122 the output signal of the measuring means is read to be further processed by the microprocessor.

We claim:

1. A transmission system comprising a transmitter for converting an input signal into a transmit signal, a channel for transporting the transmit signal, and a polarization-sensitive receiver for receiving a receive signal from the channel; the receiver comprising polarization adapting means for deriving from said receive signal a further signal having a state of polarization which is adjustable in accordance with a control signal supplied to said polarization adapting means, the transmission system further comprising means for producing polarization variations in said further signal; said receiver further comprising;

measuring means for detecting an error signal corresponding to a difference between an actual state of polarization of said further signal and a desired state of polarization thereof;

control means for deriving said control signal for the polarization adapting means from said error signal; and filter means comprised in said measuring means for suppressing frequency components in said error signal which are below a certain limit frequency, a significant number of frequency components of said polarization variations being above said limit frequency.

2. Transmission system as claimed in claim 1, characterized in that the receiver (6) comprises amplitude control means (14) which have a cut-off frequency lying below the limit frequency, which amplitude control means (14) are inserted between the polarization adapting means (8) and the measuring means (30).

3. Transmission system as claimed in claim 1, characterized in that the polarization variations comprise step-like polarization variations and in that the measuring means (30) comprise sampling means (64) for sampling an output signal of the filter means (34) at sampling instants which are delayed for a certain period of time relative to the instants at which the step-like polarization variations occur.

4. Transmission system as claimed in claim 3, characterized in that the measuring means (30) comprise reset means (66) for eliminating the energy stored in the filter means (34) at instants in time after the sampling instants.

5. A polarization-sensitive receiver comprising:

polarization adapting means for deriving from a received signal a further signal having a state of polarization which is adjustable in accordance with a control signal supplied to said polarization adapting means;

means for producing polarization variations in said further signal;

measuring means for detecting an error signal corresponding to a difference between an actual state of polarization of said further signal and a desired state of polarization thereof;

control means for deriving said control signal for the polarization adapting means from said error signal; and filter means comprised in said measuring means for suppressing frequency components in said error signal which are below a certain limit frequency, a significant number of frequency components of said polarization variations being above said limit frequency.

6. Receiver as claimed in claim 5, characterized in that the receiver (6) comprises amplitude control means (14) which have a cut-off frequency that lies below the limit frequency and are inserted between the polarization adapting means (8) and the measuring means (30).

7. Receiver as claimed in claim 5, characterized in that the polarization variations comprise step-like polarization variations, and in that the measuring means (30) comprise sampling means (64) for sampling an output signal of the filter means (34) at sampling instants which are delayed by a certain period of time relative to the instants at which the step-like polarization variations occur.

8. Receiver as claimed in claim 7, characterized in that the measuring means (30) comprise reset means (66) for eliminating at instants following the sampling instants the energy stored in the filter means (34).

* * * * *